Figure 2B:
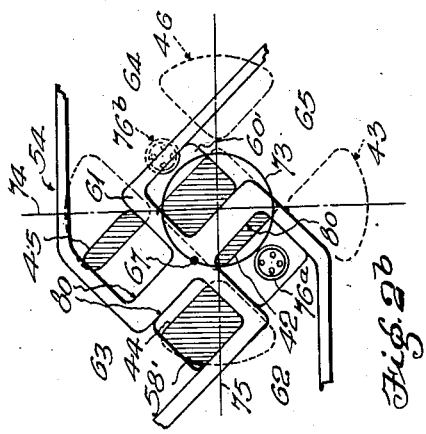
Figure 3B:
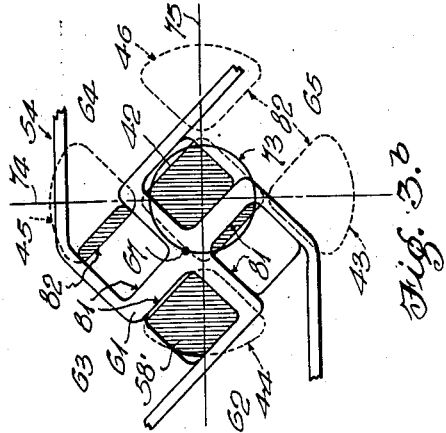
Figure 2A:
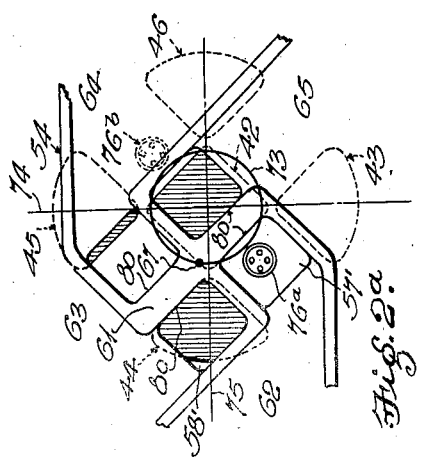
Figure 3A:
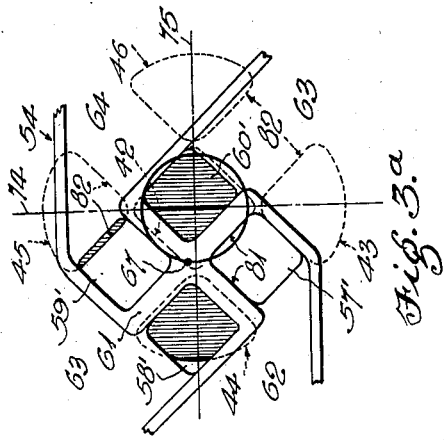

Nov. 20, 1934.  W. S. BRUBAKER  1,981,831
FLUID METER
Filed Dec. 30, 1930  6 Sheets-Sheet 1
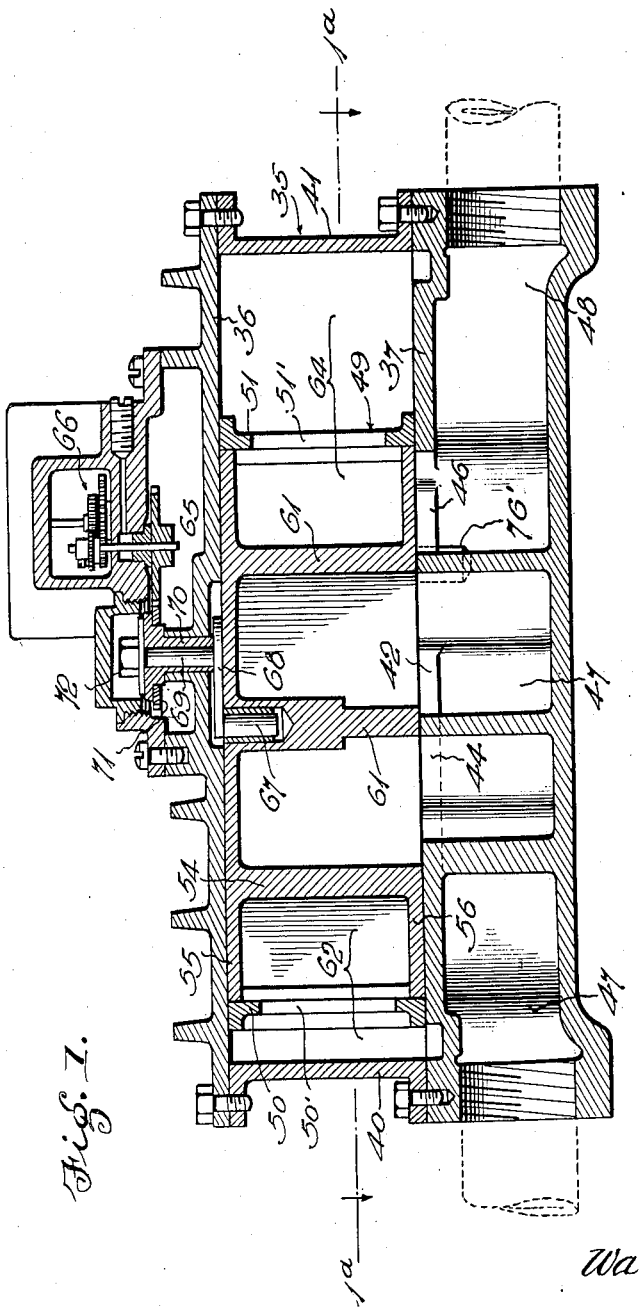
INVENTOR
Walter S. Brubaker
BY
ATTORNEY

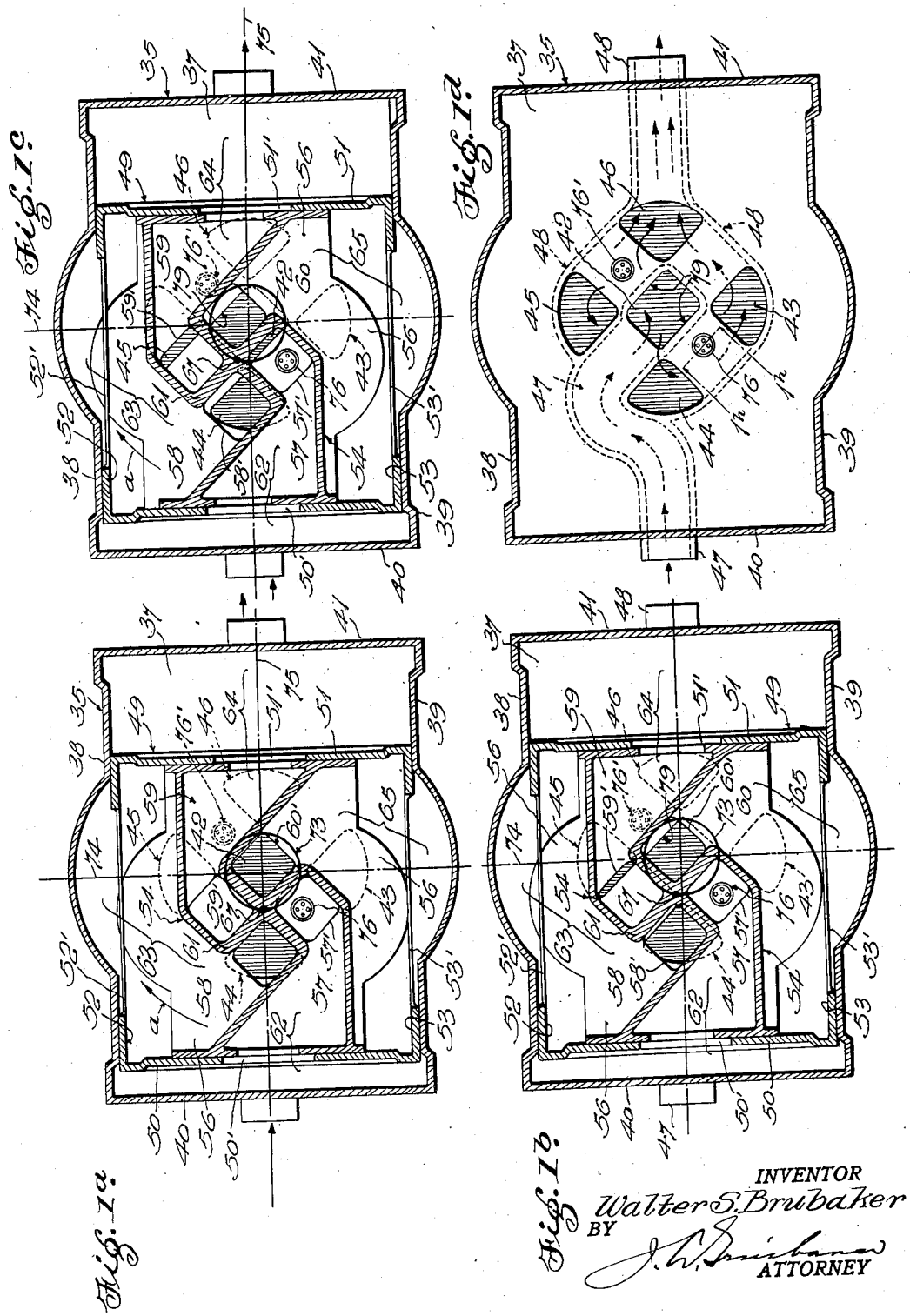

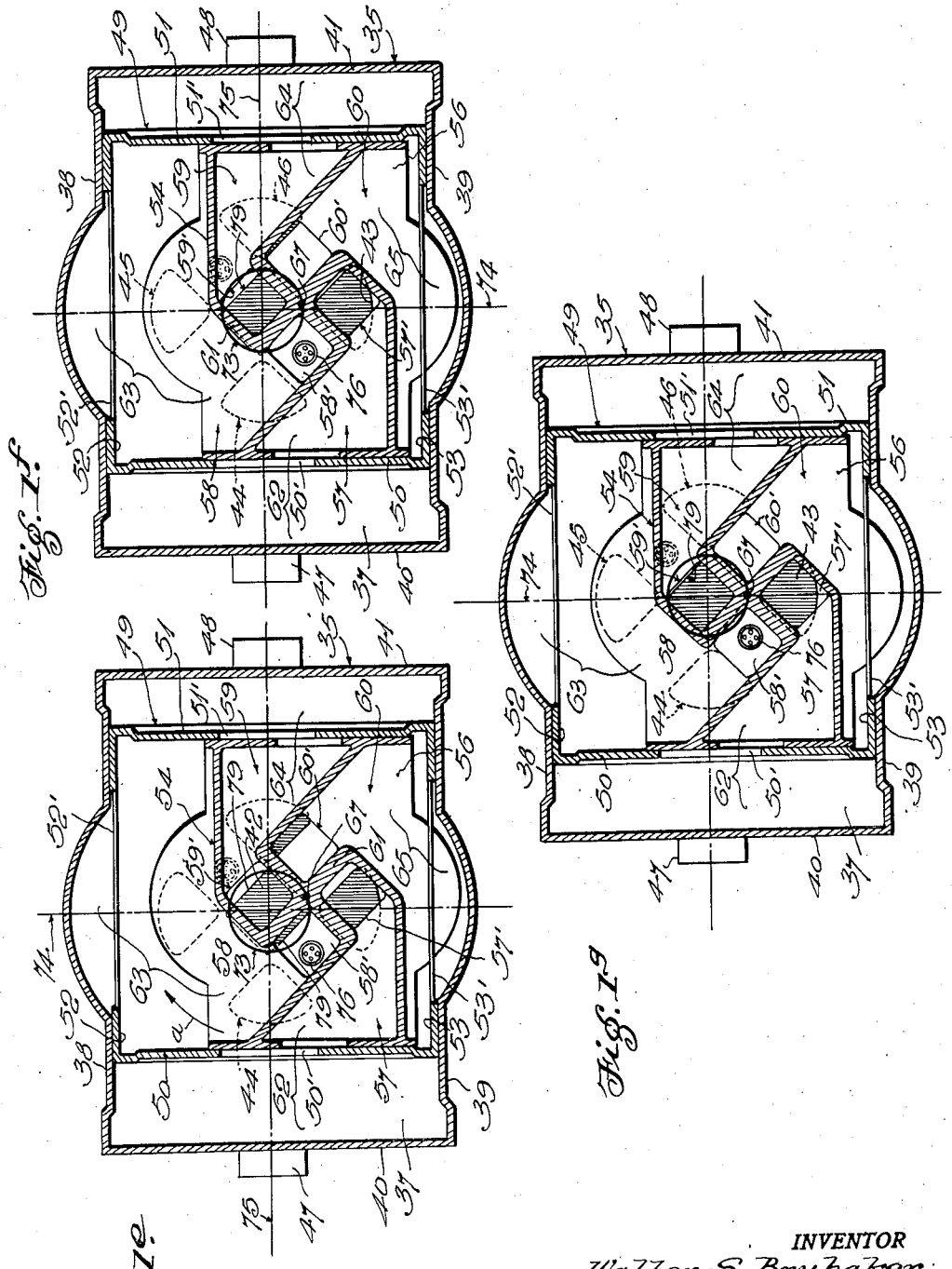

INVENTOR
Walter S. Brubaker
BY
ATTORNEY

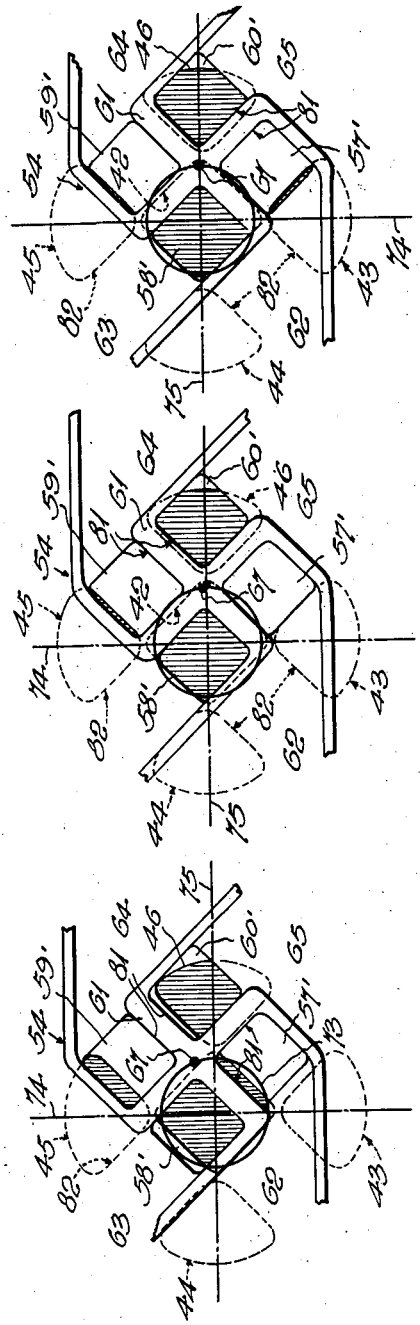

Nov. 20, 1934.      W. S. BRUBAKER          1,981,831
                       FLUID METER
                  Filed Dec. 30, 1930        6 Sheets-Sheet 6
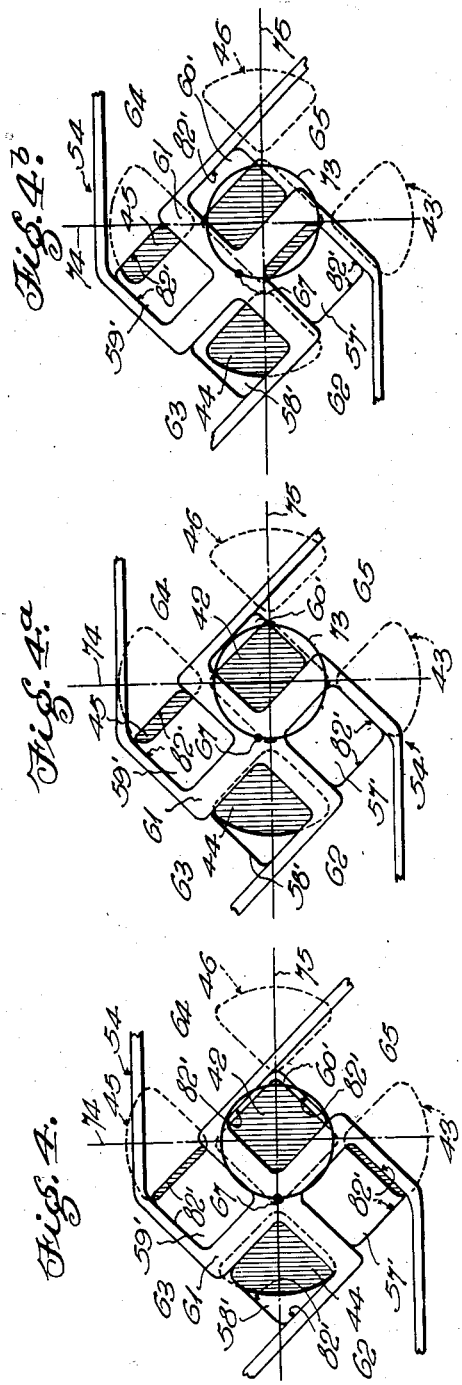
INVENTOR
Walter S. Brubaker
BY
ATTORNEY Patented Nov. 20, 1934

1,981,831

UNITED STATES PATENT OFFICE 1,981,831

FLUID METER

Walter S. Brubaker, San Francisco, Calif., assignor to Granberg Meter Corporation, San Francisco, Calif., a corporation of California Application December 30, 1930, Serial No. 505,597

16 Claims. (Cl. 73—30)

In various forms of fluid meters in which driving means for a register is driven by the fluid being metered, there is necessarily some leakage past the fluid-driven register-driving means. Due to the fact that the mechanical friction in well made meters is small and varies but little over a considerable range of speed, the leakage is reasonably uniform for any given period of time regardless of the meter speed during such period, but this leakage is not as objectionable at high meter speeds as at low, in view of the fact that the quantity of fluid flowing through the rapidly driven meter for any given period is so great that the leakage during such period constitutes only a small percentage of the delivered fluid. During relatively low meter speeds however, the quantity of fluid passing through the meter for any given period is relatively small and hence the leakage during such period constitutes a greater percentage of the delivered fluid and is hence quite a serious objection, particularly to venders of the fluid metered, and if the conventional adjusting means of the meters be adjusted to prevent over-delivery at low speeds, they will seriously under-deliver at high speeds in violation of state and municipal regulations. Thus, the accuracy curve has necessarily taken a rather sharp over-delivery trend at low speeds and this has constituted a problem for which solution has been much sought.

It has been my object, first, to provide means effective over a wide range of meter speeds for subtracting from the fluid about to be delivered by the meter, a small quantity to substantially compensate for the leakage which has passed unregistered through the meter; second to return the subtracted fluid from the discharge side to the admission side of the meter; third to provide for greater subtraction of leakage-compensating fluid per unit of flow, at low meter speeds than at high and to thereby straighten out the accuracy curve of the meter as nearly as possible, and fourth, to attain the desired ends with as little change as possible over conventional meter structures.

Considering the meter at any time, the admission side thereof may be considered as including all portions thereof which handle the ingoing fluid until the measuring chambers cease expansion. Similarly, at any time, the discharge side may be considered as including all portions which handle the outgoing fluid as the measuring chambers contract. The invention contemplates taking the leakage-compensating quantity of fluid from any suitable part of said discharge side, and the preferred forms of construction contemplate returning this fluid to any suitable part of said admission side, preferably to an intaking chamber or chambers.

In certain examples of the invention, herein disclosed, portions of the meter structure are made to co-act with simple added means, to produce reverse flow of the leakage-compensating quantity of fluid. In other examples, intrinsic parts of the meter alone accomplish the result, in that portions of the discharge side of the meter are periodically and momentarily converted into fluid-admitting means for the admission side.

Various examples of the invention are illustrated in the accompanying drawings to which specific reference will be hereinafter made.

Figs. 1 to 1$^h$ disclose a meter improved in one way to accomplish the desired end, Fig. 1 being a vertical longitudinal sectional view, Figs. 1$^a$ to 1$^g$ being diagrammatic horizontal sectional views substantially on line 1$^a$—1$^a$ of Fig. 1, and Fig. 1$^h$ being a detail vertical section on line 1$^h$—1$^h$ of Fig. 1$^d$. From this latter figure (1$^d$) the valve member and its guiding frame have been omitted to more clearly show the base ports.

Figure 2:
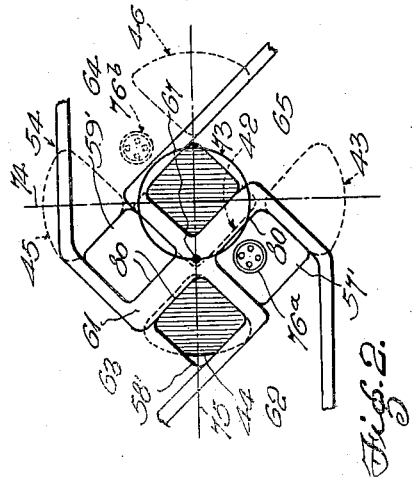

Figs. 2 to 2$^b$ are fragmentary diagrammatic horizontal sections showing a slight variation over Figs. 1 to 1$^h$.

Figure 3:
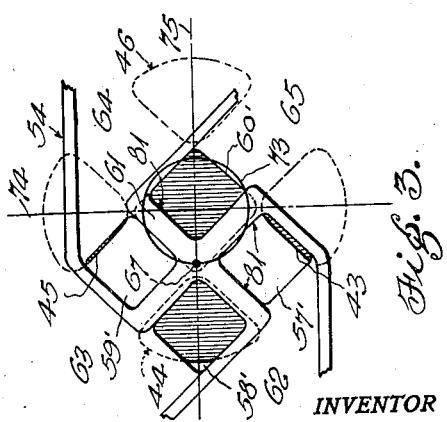

Figs. 3 to 3$^e$ are views of the same general character as Figs. 2 to 2$^b$ but showing another construction.

Figs. 4 to 4$^b$ are of the same character as previously described views but illustrate yet another structural change.

The meter structure shown in Figs. 1 to 4$^b$, is of the same general type as that shown in U. S. Patents to Granberg, 1,460,715 of July 3, 1923, Reissue 15,476 of October 24, 1922, and 1,479,961 of January 8, 1924, but to accomplish the new result, variations are made which will be fully described. One general description will first be employed, reading on the various forms of construction shown in Figs. 1 to 4$^b$. From this general description, reference to the improvements embodied in the several forms of construction, will be purposely omitted, but this deficiency will later be satisfied by individually considering each form of construction and explaining the variations which it possesses over the old structures to accomplish the required result.

The meter casing 35 embodies parallel top and bottom side walls 36 and 37, substantially parallel edge walls 38 and 39 and end walls 40 and 41. Formed through the bottom wall 37, are a central admission port 42 and four discharge ports 43, 44, 45 and 46 spaced equi-distantly around said admission port 42. The port 42 communicates with an admission passage 47 for connection with a pipe line or the like leading from an elevated tank or from a pump connected with storage. The ports 43, 44, 45 and 46 all communicate with an exhaust manifold 48 for connection with piping or the like extending to any required delivery point.

Disposed within the casing 35 in sliding contact with the casing walls 36, 37, 38 and 39, is a reciprocatory valve-guiding frame 49 itself having parallel ends 50 and 51, and parallel sides 52 and 53, said ends and sides having ports 50', 51', 52' and 53' respectively. Within the frame 49 is a gyratory valve member 54 having top and bottom side plates 55 and 56, between which are compartments 57, 58, 59 and 60 separated by webs 61. These compartments are provided with combined admission and discharge ports 57', 58', 59' and 60' respectively, all formed through the valve bottom 56, and said compartments co-act with the edge and end walls 38, 39, 40 and 41 of the casing 35 in forming fluid measuring chambers 62, 63, 64 and 65 which alternately expand and contract as the valve member 54 gyrates. As these chambers 62, 63, 64 and 65 expand, they receive the fluid to be measured from the admission passage 47, said fluid entering through the admission port 42 and the ports 57', 58', 59' and 60' and serving to drive the meter. As the chambers 62, 63, 64 and 65 contract, they expel the fluid through the aforesaid ports 57', 58', 59' and 60' and the discharge ports 43, 44, 45 and 46 respectively, to the manifold 48.

The valve member 54 always travels on a truly circular path, being confined to said path by part of the means which establishes a driving connection between said valve member and the register 66. In the present showing (see Fig. 1), a crank pin 67 on a crank 68 is rotatable in a central bearing in the valve member 54, said crank 68 being secured to the lower end of a shaft 69. This shaft 69 passes through a rotatably mounted eccentric sleeve 70 which carries the main driving gear 71 for the register 66. Sleeve 70 is normally secured to shaft 69 by any preferred means such as a nut 72. Loosening of this means 72 allows relative turning of sleeve 70 and shaft 69 to vary the throw of the crank, hence allowing such changing of the capacities of the chambers 62, 63, 64 and 65 as to obtain agreement, as nearly as heretofore possible between register reading and meter output. The path of the crank pin 67 and hence the path of the center of valve member 54, is shown by the circular line 73 on a number of the diagrammatic views, the direction of travel being indicated by arrow $a$. On these same views, I have placed the lines 74 and 75 for ease in explaining the intake and discharge "strokes" of the meter. These lines are at 90° to each other and pass through the axis of rotation of the crank formed by the parts 67, 68, 69 and 70. During the 180° travel of this crank pin 67 "below" the line 75, chamber 62 is contracted from the large extreme of its size to the small extreme thereof, said extremes of size and those hereinafter mentioned of course depending upon the relative adjustment of shaft 69 and sleeve 70. Similarly, during said 180° crank travel "below" line 75, chamber 64 becomes expanded from the small extreme of its size to the large extreme thereof. The reverse with regard to the chambers 62 and 64 takes place during the 180° travel of crank pin 67 "above" the line 75. During the 180° travel of the crank pin 67 at the left of the line 74, chamber 63 is contracted from its large to its small size extreme and chamber 65 is expanded from small to large extreme, and during the 180° travel of said crank pin at the right of said line 74, the reverse takes place with respect to said chambers 63 and 65. As the chambers expand they receive the driving fluid from the passage 47, and as they contract, they expel the fluid through the manifold 48, the admission and discharge of the fluid being controlled by the above described ports and the valve member 54 which controls registration thereof.

During functioning of the meter as above explained, the previously mentioned leakage necessarily takes place between slidably engaged parts, and I will now proceed to describe various provisions whereby a quantity of fluid which constitutes a leakage-compensating quantity at any meter speed, is automatically subtracted from the fluid being discharged from the measuring chambers. In all of these improved structures, the subtracted fluid is returned to the admission side of the meter.

In Figs. 1, 1$^a$, 1$^b$, 1$^c$, 1$^d$, 1$^e$, 1$^f$, 1$^g$ and 1$^h$, I obtain the required result by means of a port variation hereinafter described and the simple addition of two fluid conducting casings 76 and 76', check valves 77 of any desired form disposed in said casings, and casing-carried seats 78 (Fig. 1$^h$) co-acting with said valves. The casings 76 and 76' are carried by the meter casing bottom 37, the lower ends of said casings being in communication with the manifold 48 which constitutes part of the discharge side of the meter. Casing 76 is positioned to co-act with the ports 57' and 58' of the chambers 62 and 63 respectively, and casing 76' is located for co-action with the ports 59' and 60' of the chambers 64 and 65 respectively. Port 57' of chamber 62 communicates with casing 76 during the period in which the latter finishes exhausting and starts intaking, whereas port 58' of chamber 63 communicates with said casing 76 during the period in which said chamber 63 finishes intaking and starts exhausting. Similarly, port 59' of chamber 64 communicates with casing 76' during the period in which said chamber 64 finishes exhausting and begins intaking, and port 60' of chamber 65 communicates with said casing 76' during the period in which said chamber 65 finishes intaking and starts exhausting.

By the port variation above mentioned, I so time the opening and closing of the admission and discharge ports of the chambers 62, 63, 64 and 65 as to effect a partial void and a momentary abnormal pressure drop in each chamber when it is intaking and in communication with its co-operating casing 76 or 76'. The result is that during each of these momentary abnormal pressure drops, a small quantity of fluid is drawn from the discharge manifold 48 through the casing 76 or 76' past the check valve 77 thereof and into the intaking chamber then in communication with said casing 76 or 76'. These back-flowing quantities of fluid are such as to compensate for leakage past register-driving parts.

With chambers 62 and 64, the momentary abnormal pressure drop and partial void occur at the beginning of the expansion or intaking of said chambers, whereas with the chambers 63 and 65, said momentary abnormal pressure drop and partial void occur at the end of the expansion or intaking thereof. This will later become more clear by specific treatment of the subject in connection with chambers 62 and 63 by reference to Figs. 1ª to 1ᵍ of the drawings.

Before proceeding to explain the port variation making possible the above mentioned momentary abnormal pressure drop, it may be explained that by "abnormal pressure drop" I refer to a drop below the pressure which would exist in any chamber at the moment said drop occurs, if the port modifications were not employed.

The port variation under consideration, is of extreme simplicity, merely involving forming the admission port 42 with two sides thereof closer together than formerly, as seen at 79 in Figs. 1ª to 1ᵍ. While this modified port necessarily appears more or less indistinctly in a number of the views, it is clearly illustrated in Fig. 1ᵈ. The actions of this modified port and co-operating ports in effecting the above described momentary abnormal pressure drop and partial void, will now be specifically explained with reference to various views selected to best depict such actions. These actions however will be explained only with reference to the chambers 62 and 63 and those occurring with chambers 64 and 65 are the same.

Reference is first made to Fig. 1ª. The valve member 54 traveling on its circular path, has just reached the position at which port 57' of chamber 62 has moved from registration with the discharge port 43, crank pin 67 being directly on the dead center line 75 and chamber 62 being fully contracted. Further movement of the valve member 54 will now cause expansion of the chamber 62 throughout the period in which crank pin 67 is traveling 180° "above" the line 75, and with conventional meters, when said valve member 54 reaches the position shown in Fig. 1ª, the port 57' would be in readiness to open to the admission port 42 upon the initial expansion of said chamber 62. Due to the narrowed form of the modified admission port 42 however, it will be seen from Fig. 1ª that port 57' has not yet reached the lowermost of the port sides 79 and that the valve member 54 must travel several degrees further before said port 57' will open to said admission port. Hence, during travel of the valve member 54 from the position of Fig. 1ª to the position of Fig. 1ᵇ, the chamber 62 starts expansion but is closed both to the discharge port 43 and the admission port 42, the result being that an abnormal pressure drop and partial void is produced in said chamber 62. During the existence of this partial void, it will be observed that the upper end of the casing 76 is exposed to the chamber 62. The result is that a small quantity of fluid from the discharge manifold 48 will be drawn through said casing 76 into the partial void in said chamber 62, the fluid of course unseating the check valve 77. As the valve member 54 continues past the position of Fig. 1ᵇ and chamber 62 continues to expand, the admission port 42 opens to said chamber as will be clear from Fig. 1ᶜ and the driving fluid enters. This incoming fluid closes the check valve 77, and drives the meter in the usual way.

Whereas, chamber 62 receives the backwardly drawn leakage-compensating quantity of fluid at the beginning of its expansion or intaking "stroke" and this is also true of chamber 64, the chambers 63 and 65 receive corresponding quantities of backwardly drawn fluid at the end of their expansion or intaking "strokes", as will now be explained by reference to Figs. 1ᵉ, 1ᶠ, and 1ᵍ.

From Fig. 1ᵉ, it will be seen that crank pin 67 has not yet completed its 180° travel to the right of the center line 74 and consequently chamber 63 has not completed expanding or intaking. Further movement of the valve member 54 however, will close the admission port 42 to the chamber 63 as seen in Fig. 1ᶠ, but when this occurs, crank pin 67 has not quite completed its aforesaid travel to the right of line 74 and hence chamber 63 has not finished expansion. It will thus be seen that the admission port 42 has been prematurely closed to chamber 63, with the result that as this chamber completes its expansion, a partial void will be formed. When this occurs, the casing 76 is exposed to the chamber 63 and hence a leakage-compensating quantity of fluid will be drawn from the discharge manifold through the casing 76 into said chamber 63. By the time crank pin 67 reaches the line 74 and chamber 63 is in readiness to contract and discharge its contents, the discharge port 44 is about to open to said chamber as seen in Fig. 1ᵍ. During such chamber contraction, the check valve 77 in casing 76 of course closes and remains closed.

The maximum conducting capacities of the casings 76 and 76' are constant at all meter speeds, and the pressure difference between the manifold 48 and the admission port 42 will vary only within a relatively narrow range. Hence, it can be seen that the volume of fluid which will be returned from the discharge side of the meter to the admission side thereof, will be fairly constant for any given period of time and will thus bear a proportionately greater difference to a low rate of flow through the meter in gallons per minute than to a high rate of flow. Consequently, the returned fluid will largely balance the leakage past register-driving parts and will substantially "straighten out" the accuracy curve of the conventional meters, practically eliminating over-delivery at low speeds without causing intolerable under-delivery at high speeds.

To obtain the required result, it will not suffice that the liquid carried back be a definite quantity per unit of flow but it must be a fairly definite quantity per unit of time. For example, the reverse flow at forty revolutions or cycles per minute, should be one-half as much per cycle as at twenty revolutions or cycles per minute. Such results are attained in the forms of the invention herein disclosed, by providing a measuring chamber capable of creating suction when expanding, by establishing a restricted back-flow channel of one maximum conducting capacity at all meter speeds, from an outgoing liquid passage of the meter to said chamber during expansion of the latter, and by establishing said restricted back-flow channel for one definite fraction per cycle of chamber expansion at any meter speed. Thus, the speed of the meter will control the number and duration of the back-flow channels established in any given period of time, and will also control the duration of the suction acting on each channel, and the controlling forces, among which is inertia, will allow passage of the liquid through said channels in leakage-compensating quantity.

In other forms of construction hereinafter described, the same results are obtained.

In the form of construction shown in Figs. 2, 2ª and 2ᵇ, instead of modifying the admission port 42 to vary the timing of the ports, said port 42 is left square and two of the radial webs 61 are thickened sufficiently to cause their opposite sides 80 to co-act with said admission port 42 in attaining the same momentary abnormal pressure drops in the chambers 62, 63, 64 and 65, as above explained. The valve-containing casings 76ª and 76ᵇ in Figs. 2, 2ª and 2ᵇ correspond to the casings 76 and 76′ above described and act in the same way to conduct fluid from the discharge manifold 48 to the chambers when the partial voids are created in the latter. Examples as to operation, are given in Figs. 2, 2ª and 2ᵇ with respect to chamber 62 and will be explained, and considering the analogy of this construction to that of Figs. 1ª, 1ᵇ, etc., the operation with regard to the other chambers may then be readily understood without further illustration or description.

In Fig. 2, crank pin 67 is directly on the dead center line 75 and consequently chamber 62 is ready to start expansion, but it will be seen that one of the thickened web portions 80 is still closing the admission port 42 to said chamber 62. Consequently, as crank pin 67 moves from the position of Fig. 2 to that of Fig. 2ª and chamber 62 initially expands, the delayed opening of the admission port 42 causes the production of a partial void in said chamber 62, with the result that fluid from the manifold 48 is then drawn into the chamber through the casing 76ª. As soon as crank pin 67 travels past the position of Fig. 2ª, the admission port 42 opens and the incoming fluid closes the check valve within the casing 76ª, and drives the meter as usual, as will be seen from an inspection of Fig. 2ᵇ.

In Figs. 3, 3ª, 3ᵇ, 3ᶜ, 3ᵈ and 3ᵉ, the desired results are attained without the use of check valves. In the construction illustrated in these views, all of the radial webs 61 of the valve member 54 are widened and all of the discharge ports 43, 44, 45 and 46 are widened so that the sides 81 of the former and the sides 82 of the latter will co-act in so changing the timing of admission and discharge port functioning with respect to chamber expansion, as to create two momentary, abnormal pressure drops and partial voids in each chamber per revolution of the valve member 54 and to place the exhaust ports of the chambers in communication with the latter during the existence of such partial voids. The changed timing makes these functions possible by delaying closing of the exhaust port of each chamber and delaying opening of the admission port thereof when the chamber starts to expand and intake, and by prematurely closing the admission port and prematurely opening the exhaust port of each chamber as the latter completes its expansion and intaking. Thus, in this form of construction, the leakage-compensating fluid will flow back from the discharge side of the meter to the intaking chambers through restricted backflow channels formed by the discharge ports of said chambers, instead of requiring special valved back-flow passages such as the casings 76, 76′, 76ª and 76ᵇ, and it will be observed that each of said back-flow channels possesses one maximum conducting capacity at all meter speeds. Hence, it will be seen that I momentarily and periodically convert part of the discharge side of the meter into fluid admitting means for the admission side of said meter, causing intrinsic parts of the meter to alone function as a pump for creating back-flow of the fluid which is to compensate for leakage.

The action of ports is identical for all of the chambers 62, 63, 64 and 65 and specific explanation will be given only in connection with the ports of chamber 62, reference being made first to Figs. 3, 3ª and 3ᵇ to explain admission of the leakage-compensating fluid when said chamber starts expansion and intaking, and then to Figs. 3ᶜ, 3ᵈ and 3ᵉ to make clear the manner in which such fluid is admitted to said chamber as the latter completes its expansion and intaking.

In Fig. 3, it will be observed that crank pin 67 is directly on the center line 75 and hence further movement of the valve member 54 will effect expansion of the chamber 62. It will further be observed however, that the discharge port 43 has not yet entirely closed and that the admission port 42 has not yet opened. Hence, the movement of the valve member 54 from the position of Fig. 3 to that of Fig. 3ª, will create a momentary pressure drop and partial void in chamber 62 during the initial expansion of this chamber, and this momentary pressure drop causes fluid from the discharge side of the meter to flow back through the open discharge port 43 into the partial void in said chamber. When the valve member 54 reaches the position of Fig. 3ª, the discharge port 43 is closed and the backflow ceases, and movement of said valve member past the position of Fig. 3ª, effects opening of the admission port 42 as will be clear from Fig. 3ᵇ, admitting the driving fluid to the chamber 62 as the latter continues to expand. Such admission of fluid through port 42 however, is arrested as chamber 62 nears the end of its expansion, and said chamber is then placed in premature communication with the exhaust port 43 to draw back another small quantity of fluid from the discharge side of the meter as said chamber completes its expansion. This will now be explained fully by reference to Figs. 3ᶜ, 3ᵈ and 3ᵉ.

In Fig. 3ᶜ, the crank pin 67 has neared the end of its 180° travel "above" the line 75 but the chamber 62 of the meter, is still expanding and receiving fluid through the admission port 42. In Fig. 3ᵈ, the valve member 54 has traveled further, the admission port 42 has been prematurely and completely closed, and the exhaust port 43 is in readiness to open. Consequently, as chamber 62 completes its final expansion, port 43 will prematurely open and an abnormal pressure drop and partial void will be produced in this chamber. This partial void in chamber 62 will receive backflow of fluid through the discharge port 43 as said chamber completes its final expansion, as will be clear from Fig. 3ᵉ.

In Figs. 3 to 3ᵉ, all of the chambers 62, 63, 64 and 65 and their co-acting ports, function in the same way as described in connection with chamber 62 and its co-operating ports 42 and 43, each chamber receiving a small leakage-compensating back-flow both at the beginning and toward the end of its expansion.

In the form of construction shown in Figs. 4, 4ª and 4ᵇ, the same results as those attained with the construction of Figs. 3, 3ª and 3ᵇ, etc., are attained, but without modification of any of the base ports 42, 43, 44, 45 or 46. These ports remain as in the standard Granberg meters as previously manufactured. The change over the old meter structure to vary timing and effect periodic momentary back-flow, is totally in the valve member, and said change consists virtually in bodily shifting the ports 57′, 58′, 59′ and 60′ of the chambers 62, 63, 64 and 65 further from the center of the valve member 54, so that in addition to having its webs 61 thickened as in Figs. 3, 3ª and 3ᵇ, etc. and the inner walls of said ports consequently spaced further outward, the outer walls 32′ of said ports are also spaced outward a corresponding amount. Considering Figs. 4, 4ª and 4ᵇ, it will be seen that these modifications attain the same results as described in connection with Figs. 3 to 3ᵉ, that is they provide for momentary back-flow of fluid from the discharge side of the meter to the intaking chambers, through restricted port-formed back-flow channels both at the beginning and completion of their expansion, and each of said back-flow channels possesses one maximum conducting capacity at all meter speeds.

In Fig. 4, the crank pin 67 is on the dead center line 75 and as it starts its 180° travel "above" said line, chamber 62 starts to expand, and as the discharge port 43 is partly open to said chamber 62, back-flow of fluid will momentarily take place from the discharge side of the meter through said port 43 into the chamber 62. When the valve member 54 reaches the position shown in Fig. 4ª, port 43 has closed and the admission port 42 is ready to open and allow the chamber 62 to intake in the usual way as seen in Fig. 4ᵇ. As this chamber nears the end of its expansion however, the admission port 42 prematurely closes and the discharge port 43 prematurely opens, again causing momentary back-flow into said chamber from the discharge side of the meter.

In all of the forms of construction previously described specifically, the leakage-compensating fluid has been drawn back into the partial voids under the influence of abnormal, momentary pressure drops occurring periodically in the measuring chambers during expansion thereof.

In the foregoing, by mentioning changing of port timing, I of course refer to changes over the timing of the conventional meters. Hence, delayed port opening or closing refers to delaying such opening or closing until after corresponding opening or closing would occur in the conventional meters. Similarly, closing or opening ports prematurely, refers to closing or opening them before they would open in the conventional meters. In these conventional meters, the admission ports completely close and the discharge ports are ready to open when the chambers have reached the limit of their expansion and are in readiness to start contracting. Similarly, the discharge ports are completely closed and the admission ports in readiness to open when the chambers have completed their contraction and are ready to expand. While the changed timing which I employ produces momentary, periodic, pressure changes in the meter chambers, such changes do not interfere with proper driving of the meter, for at the time any chamber is encountering such pressure change, another chamber is inletting the driving fluid and consequently ample meter driving power is then available and utilized.

While in the forms of construction so far specifically described, I have illustrated only structures for moving the back-flowing fluid along certain channels, it will be obvious that within the scope of the invention, provision could be made for conducting the back-flowing fluid along other channels.

In the foregoing, I have disclosed various ways of carrying out the invention, but it is to be understood that within the scope of said invention as claimed, numerous variations over the illustrations herein given, might well be made.

It will be further understood that the invention may be incorporated in displacement meters of other types than the Granberg meter. Then too, it may be explained that this Granberg meter will operate if the main discharge passage be used for the fluid inlet and the main fluid inlet used for the exhaust of the fluid. Obviously, my improvements could well be adapted to the meter even if this reversed principle should be permanently utilized.

I claim:—

1. A meter embodying a casing having a fluid inlet and a fluid outlet, means in said casing for measuring most of the fluid passing therethrough but allowing some leakage to the discharge side of the meter, means for conducting the leakage from the discharge side of the meter to the admission side thereof, and means formed by intrinsic parts of said measuring means and effective at various meter speeds for causing return flow of a leakage-compensating quantity of fluid through said conducting means to the admission side of the meter.

2. A meter comprising a casing having a fluid inlet and a fluid outlet, valved fluid-measuring means in said casing acting periodically and momentarily as suction-creating means and allowing leakage of some unmeasured fluid to the discharge side of the meter, passage-forming means for providing a leakage-return passage from the discharge side of the meter to said measuring means, and valve means for opening said passage to flow only when said measuring means acts as suction-creating means.

3. A meter comprising a casing having a fluid inlet and a fluid outlet, fluid-measuring means in said casing including an expansible and contractible fluid-measuring chamber through which some fluid may leak unmeasured to the discharge side of the meter, valve means for said measuring chamber active to bar admission of fluid thereto from said fluid inlet during a fraction of chamber expansion, passage-forming means for providing a leakage return passage from the discharge side of the meter to said measuring chamber, and valve means for opening said passage to flow only during said fraction of chamber expansion, whereby the leakage may return to the measuring chamber.

4. In a fluid meter, a casing, fluid-driven, register-driving means in said casing embodying an expansible and contractible fluid-handling chamber and valve means for controlling admission of fluid to and exhaust of fluid from said chamber, a passage for placing said chamber in direct communication with the discharge side of the meter during expansion of said chamber, said valve means being timed to momentarily bar admission of the driving fluid to said chamber during expansion of the latter, thus permitting a leakage-compensating quantity of fluid to flow from the fluid discharge passage of the meter into said chamber through the aforesaid passage, and means for preventing flow through said passage.

5. A meter comprising a casing, one side of the latter having a fluid admission port and a plurality of discharge ports spaced around said admission port, fluid discharge means communicating with said discharge ports, fluid-driven register-driving means within said casing and including a valve, said casing and said register-driving means having coacting portions forming expansible and contractible chambers, each of said chambers being adapted to communicate with said admission port during chamber expansion and with a discharge port during chamber contraction, said valve and the admission port of at least one of said chambers being related to cut off said one chamber from said admission port during part of the expansion of said one chamber, whereby a reduction of pressure will then be produced in said one chamber, a passage through part of said casing communicating at one end with said fluid-discharge means, the other end of said passage being positioned to communicate with said one chamber when said reduction of pressure occurs in the latter, whereby a leakage-compensating quantity of fluid will then enter said one chamber from said fluid-discharge means, and valve means for preventing back flow of fluid through said passage.

6. A meter comprising a casing having parallel side walls and parallel edge walls, one of said side walls having an admission port and a plurality of discharge ports spaced around said admission port, fluid-discharge means communicating with said discharge ports, a reciprocatory valve-guiding frame within said casing slidably engaging said parallel side and edge walls and itself having parallel end walls, a gyratory register-driving valve member within said valve-guiding frame slidably engaging said end walls thereof and said side walls of said casing, said casing, frame and valve member having co-acting portions forming expansible and contractible chambers, portions of the latter being formed by said casing side walls, each of said chambers being adapted to communicate with said admission port during chamber expansion and with a discharge port during chamber contraction, said valve member and the admission port of at least one of said chambers being related to cut off communication of said one chamber with said admission port during part of the chamber expansion, whereby a reduction of pressure will then be produced in the latter, a passage through one side wall of said casing communicating at one end with said fluid-discharge means, the other end of said passage being positioned to communicate with said one chamber when said reduction of pressure occurs in the latter, whereby a leakage-compensating quantity of fluid will then enter said one chamber from said fluid-discharge means, and a check valve in said passage preventing back flow therethrough.

7. A meter comprising a casing, fluid-driven register-driving means in said casing embodying a chamber which is alternately transformed from one size extreme to another during meter operation, said chamber being capable of creating suction when expanding, valve-controlled admission means for admitting fluid to said chamber during expansion thereof, and valve-controlled discharge means for exhausting fluid from said chamber during contraction thereof, said valve-controlled admission and discharge means being relatively timed to momentarily effect an abnormal pressure drop in said chamber at one phase of its size increase and to then open said discharge means to back flow, whereby said pressure drop may be utilized to effect backflow of a leakage-compensating quantity of the meter-handled fluid at any meter speed.

8. A meter comprising a casing, one side of the latter having a fluid admission port and a plurality of discharge ports spaced around said admission port, fluid-discharge means communicating with said discharge ports, fluid-driven register-driving means within said casing and including a valve for said ports, said casing and said register-driving means having co-acting portions forming expansible and contractible chambers, each of said chambers being adapted to communicate with said admission port during chamber expansion and with a discharge port during chamber contraction, said valve and the co-operating ports of at least one of said chambers being related to momentarily cause suction in said one chamber with the discharge port thereof partially open thereby allowing a leakage-compensating quantity of fluid to enter the chamber from the discharge side of the meter.

9. A meter comprising a casing having parallel side walls and parallel edge walls, one of said side walls having an admission port and a plurality of discharge ports spaced around said admission port, fluid-discharge means communicating with said discharge ports, a reciprocatory valve-guiding frame within said casing slidably engaging said parallel side and edge walls and itself having parallel end walls, a gyratory register-driving valve member within said valve-guiding frame slidably engaging said end walls thereof and said side walls of said casing, said casing, frame and valve member having co-acting portions forming expansible and contractible chambers, portions of the latter being formed by said casing side walls, each of said chambers being adapted to communicate with said admission port during chamber expansion and with a discharge port during chamber contraction, said valve member and the co-operating ports of at least one of said chambers being related to momentarily cause suction in said chamber with the discharge port thereof partially open, whereby a leakage-compensating quantity of fluid may then flow into said chamber from the discharge side of the meter.

10. In a meter, a casing having a fluid admission port and a plurality of discharge ports spaced around said admission port, and register-driving means embodying a gyratory valve member having compartments co-operable with said casing in forming chambers which expand and intake through said admission port, and contract and discharge through said discharge ports as the valve member gyrates, said valve member and ports being related to delay opening of said admission port to the chambers and delay closing of the discharge ports to said chambers, whereby leakage-compensating quantities of fluid will be drawn from said discharge ports into the chambers as the latter start to expand and intake.

11. In a meter, a casing having a fluid admission port and a plurality of discharge ports spaced around said admission port, and register-driving means embodying a gyratory valve member having compartments co-operable with said casing in forming chambers which expand and intake through said admission port, and contract and discharge through said discharge ports as the valve member gyrates, said valve member and ports being related to prematurely close said admission port to the chambers and prematurely open said discharge ports to said chambers, whereby leakage-compensating quantities of fluid will be drawn back from said discharge ports into the chambers as the latter complete expansion and intaking.

12. In a meter, a casing having a fluid admission port and a plurality of discharge ports spaced around said admission port, and register-driving means embodying a gyratory valve member having compartments co-operable with said casing in forming chambers which expand and intake through said admission port, and contract and discharge through said discharge ports as the valve member gyrates, said valve member and ports being related to delay opening of said admission port to the chambers and delay closing of the discharge ports to said chambers, whereby leakage-compensating quantities of fluid will be drawn from said discharge ports into the chambers as the latter start to expand and intake, said valve member and ports being also related to prematurely close said admission port to the chambers and to prematurely open said discharge ports to said chambers, whereby leakage-compensating quantities of fluid will be drawn from said discharge ports into the chambers as the latter complete expansion and intaking.

13. In a meter in which fluid can leak unmeasured from the admission to the discharge side, an alternately expanding and contracting measuring chamber capable of creating suction when expanding, valved admission and discharge means for said chamber related to create a partial void in said chamber for one definite fraction of chamber expansion at all meter speeds, and channel-forming means for providing a restricted back-flow channel of one maximum conducting capacity from part of the discharge side of the meter to said chamber only during existence of said partial void, whereby the speed of the meter will control the number and duration of the channels established in any given period of time and also the duration of the partial voids acting on the channels, and the controlling forces will allow the passage of a leakage-compensating quantity of fluid through said channels.

14. In a meter in which fluid can leak unmeasured from the admission to the discharge side, a gyratory valve and means co-operating therewith in forming expansible and contractible measuring chambers capable of creating suction when expanding, fluid admission and exhaust ports for said chambers controlled by said valve, the valve and ports being related to produce a partial void in at least one of said chambers at one point in its expansion, a passage permanently positioned to connect said one chamber with the discharge side of the meter when said partial void occurs, whereby a leakage-compensating quantity of fluid will be drawn through said passage, and a check valve in said passage for preventing backflow of fluid therethrough.

15. In a meter in which fluid can leak unmeasured from the admission side of the meter to the discharge side thereof, a gyratory valve and means co-operating therewith in forming expansible and contractible measuring chambers capable of creating suction when expanding, fluid admission and exhaust ports for said chambers controlled by said valve, the valve and ports being related to cause a partial void in at least one of said chambers for one definite fraction of its expansion at all meter speeds and for then placing said chamber in communication with its exhaust port to establish a back-flow channel of one maximum conducting capacity at all meter speeds, whereby a leakage-compensating quantity of fluid will then be drawn into the chamber from the discharge side of the meter.

16. A meter comprising a casing having a fluid inlet and a fluid outlet, fluid measuring means in said casing allowing some leakage of unmeasured fluid to the discharge side of the meter, passage-forming means for providing a leakage conducting passage from the discharge side of the meter to the admission side thereof, and means wholly within the meter structure and effective in proportion to the speed of the meter for subtracting through said passage a leakage compensating quantity of fluid from the discharge side of the meter, whereby said quantity is returned to the admission side of the meter.

WALTER S. BRUBAKER.